(12) United States Patent
Chang et al.

(10) Patent No.: US 12,131,572 B1
(45) Date of Patent: Oct. 29, 2024

(54) CAPACITIVE FINGERPRINT SENSOR

(71) Applicant: AUO Corporation, Hsinchu (TW)

(72) Inventors: Xiang-Rui Chang, Hsinchu (TW); Chao-Chien Chiu, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/460,602

(22) Filed: Sep. 4, 2023

(30) Foreign Application Priority Data

Apr. 10, 2023 (TW) ................................ 112113346

(51) Int. Cl.
*G06V 40/13* (2022.01)
(52) U.S. Cl.
CPC ................................ *G06V 40/1306* (2022.01)
(58) Field of Classification Search
CPC ................ G06V 40/1306; G06V 40/12–1394
See application file for complete search history.

(56) References Cited

U.S. PATENT DOCUMENTS

| 11,676,415 B2 | 6/2023 | Lee et al. | |
| 2010/0149128 A1* | 6/2010 | No ...................... | G06F 3/0447 345/174 |
| 2011/0096037 A1* | 4/2011 | Virzi ...................... | G06F 3/043 345/177 |
| 2013/0314148 A1* | 11/2013 | Kang ................ | G06V 40/1306 327/517 |
| 2017/0075496 A1* | 3/2017 | Rosenberg .......... | G06F 3/03545 |
| 2022/0100984 A1* | 3/2022 | Lin ..................... | G06V 40/1306 |
| 2022/0300590 A1 | 9/2022 | Chou et al. | |
| 2022/0327855 A1 | 10/2022 | Lee et al. | |

FOREIGN PATENT DOCUMENTS

| TW | I693554 | 5/2020 |
| TW | 202238354 | 10/2022 |
| TW | 202241119 | 10/2022 |

* cited by examiner

*Primary Examiner* — Premal R Patel
(74) *Attorney, Agent, or Firm* — JCIPRNET

(57) ABSTRACT

A capacitive fingerprint sensor is provided. The capacitive fingerprint sensor includes a plurality of capacitive sensing pixels. Each of the capacitive sensing pixels includes a sensing node, a first transistor, a sensing capacitor and a second transistor. The first transistor has a first terminal receiving a first system voltage, a control terminal receiving a reset control signal, and a second terminal coupled to the sensing node. The sensing capacitor is coupled between the sensing node and a sensing control signal. The second transistor has a first terminal receiving a second system voltage, a control terminal receiving a sensing voltage of the sensing node, and a second terminal providing a sensing output signal.

5 Claims, 3 Drawing Sheets

CAPACITIVE FINGERPRINT SENSOR

CROSS-REFERENCE TO RELATED APPLICATION

This application claims the priority benefit of Taiwan application serial no. 112113346, filed on Apr. 10, 2023. The entirety of the above-mentioned patent application is hereby incorporated by reference herein and made a part of this specification.

BACKGROUND

Technical Field

The invention relates to a fingerprint sensor, and particularly relates to a capacitive fingerprint sensor.

Description of Related Art

Fingerprint is a physical feature of human beings, and since no one may have the same fingerprint as others, the fingerprint is extremely suitable for serving as a characteristic for identity identification. At present, fingerprints have been widely used in personal electronic system login, entry and exit control, etc. However, due to the high resolution required for fingerprint collection, some organizations still use optical sensing. However, optical sensing requires an additional backlight module, which is costly and will result in a thicker sensor mechanism.

SUMMARY

The invention is directed to a capacitive fingerprint sensor, which has high-resolution capacitive sensing pixels, thereby having lower hardware cost and thinner mechanism thickness.

The invention provides a capacitive fingerprint sensor including a plurality of capacitive sensing pixels. Each of the capacitive sensing pixels includes a sensing node, a first transistor, a sensing capacitor and a second transistor. The first transistor has a first terminal receiving a first system voltage, a control terminal receiving a reset control signal, and a second terminal coupled to the sensing node. The sensing capacitor is coupled between the sensing node and a sensing control signal. The second transistor has a first terminal receiving a second system voltage, a control terminal receiving a sensing voltage of the sensing node, and a second terminal providing a sensing output signal.

Based on the above description, in the fingerprint sensor of the embodiment of the invention, each capacitive sensing pixel may be composed of a first transistor, a second transistor, a sensing capacitor and a current source, i.e., the capacitive sensing pixels with a low circuit area are used to form a high resolution capacitive fingerprint sensing panel. Moreover, since the capacitive fingerprint sensing panel does not require a backlight module, the cost of hardware is reduced and a thickness of the mechanism is reduced.

To make the aforementioned more comprehensible, several embodiments accompanied with drawings are described in detail as follows.

DESCRIPTION OF THE EMBODIMENTS

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that although the terms "first", "second", "third", etc. may be used for describing various elements, components, regions, layers and/or portions, the elements, components, regions, layers and/or portions are not limited by these terms. These terms are only used for separating one element, component, region, layer or portion from another element, component, region, layer or portion. Therefore, the following discussed "first element", "component", "region", "layer" or "portion" may be referred to as the second element, component, region, layer or portion without departing from the scope of the invention.

The terminology used herein is for the purpose of describing particular embodiments and is not intended to be limiting of the invention. As used herein, the singular forms "a," "an" and "the" are intended to include the plural forms as well, unless the context clearly indicates otherwise. "or" represents "and/or". The term "and/or" used herein includes any or a combination of one or more of the associated listed items. It will be further understood that the terms "comprises," "comprising," "includes" and/or "including," when used herein, specify the presence of stated features, regions, integers, steps, operations, elements, and/or components, but do not preclude the presence or addition of one or more other features, regions, integers, steps, operations, elements, components, and/or groups thereof.

Figure 1:
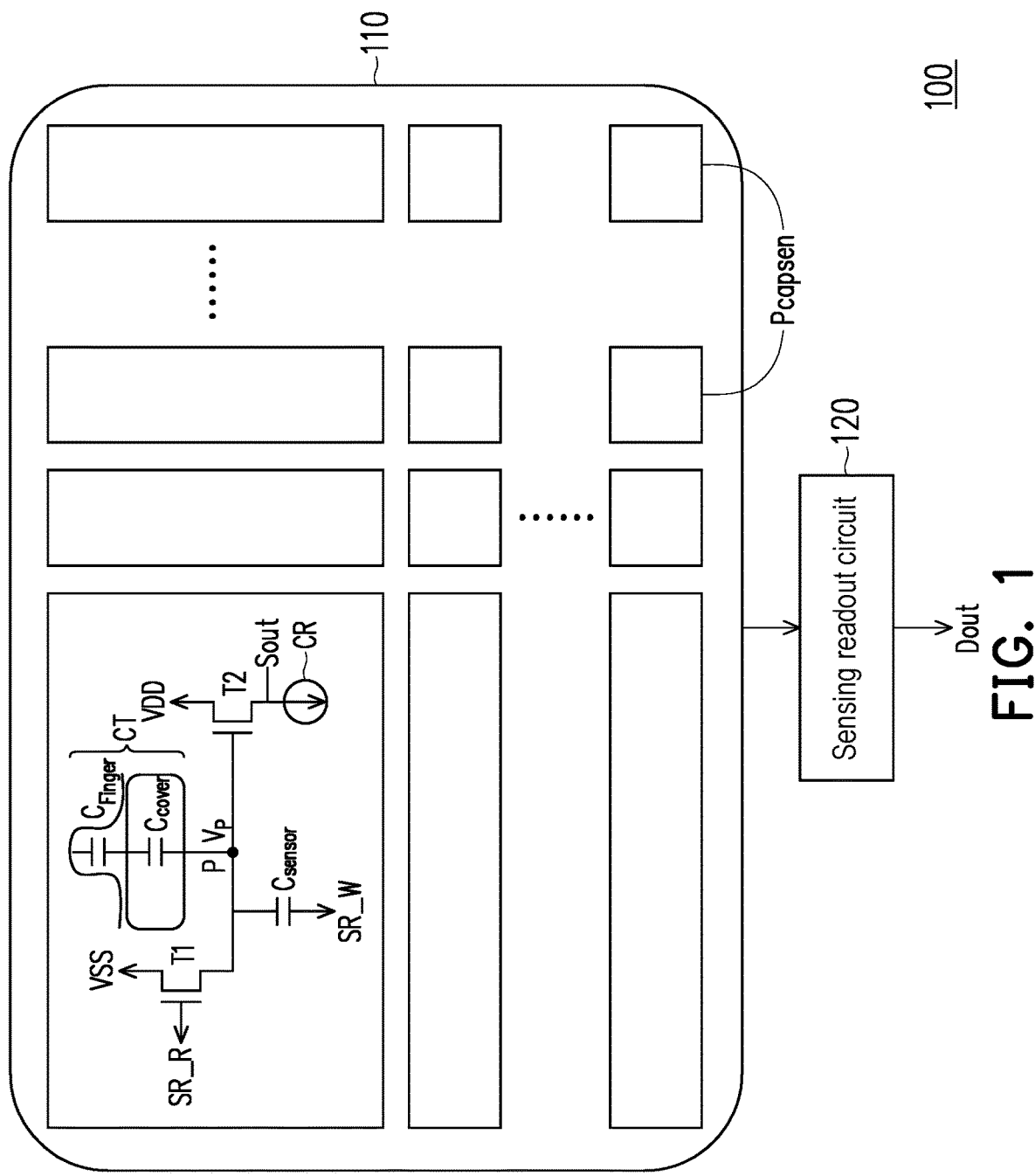
FIG. 1 is a schematic circuit diagram of a capacitive fingerprint sensor according to an embodiment of the invention.

FIG. 1 is a schematic circuit diagram of a capacitive fingerprint sensor according to an embodiment of the invention. Referring to FIG. 1, in the embodiment, a capacitive fingerprint sensor 100 includes a capacitive fingerprint sensing panel 110 and a sensing readout circuit 120, where the capacitive fingerprint sensing panel 110 includes a plurality of capacitive sensing pixels Pcapsen arranged in an array. Each capacitive sensing pixel Pcapsen provides a sensing output signal Sout based on sensing the corresponding fingerprint as a valley (or groove) or a ridge (or peak), and the sensing readout circuit 120 is coupled the capacitive sensing pixels Pcapsen to provide output data Dout related to the fingerprint based on the sensing output signals Sout of the capacitive sensing pixels Pcapsen. In addition, in the embodiment of the invention, the capacitive sensing pixels Pcapsen may be arranged in a non-array manner, and the embodiment of the invention is not limited thereto.

In the embodiment, each capacitive sensing pixel Pcapsen may include a sensing node P, a first transistor T1, a second transistor T2, a sensing capacitor $C_{sensor}$, and a current source CR, where the first transistor T1 and the second transistor T2 are, for example, respectively N-type transistors, but the embodiment of the invention is not limited thereto. The first transistor T1 has a first terminal receiving a first system voltage VSS, a control terminal receiving a reset control signal SR_R, and a second terminal coupled to the sensing node P. The sensing capacitor $C_{sensor}$ is coupled between the sensing node P and a sensing control signal SR_W. The second transistor T2 has a first terminal receiving a second system voltage VDD, a control terminal receiving a sensing voltage Vp of the sensing node P, and a second terminal providing the sensing output signal Sout. The current source CR is coupled to the second terminal of the second transistor T2.

In the embodiment of the invention, each capacitive sensing pixel Pcapsen may be composed of the sensing node P, the first transistor T1, the second transistor T2, the sensing capacitor $C_{sensor}$ and the current source CR, i.e., the capacitive sensing pixels Pcapsen with a low circuit area are used to form the high resolution capacitive fingerprint sensing panel 110. Moreover, since the capacitive fingerprint sensing panel 110 does not require a backlight module, the cost of hardware may be reduced and a thickness of the mechanism may be reduced.

In the embodiment of the invention, the current source CR is to accelerate a discharge rate of charges, and the current source CR may be omitted when the discharge rate is not considered; or, other elements may be used to replace the current source CR, but the embodiment of the invention is not limited thereto.

Figure 2:
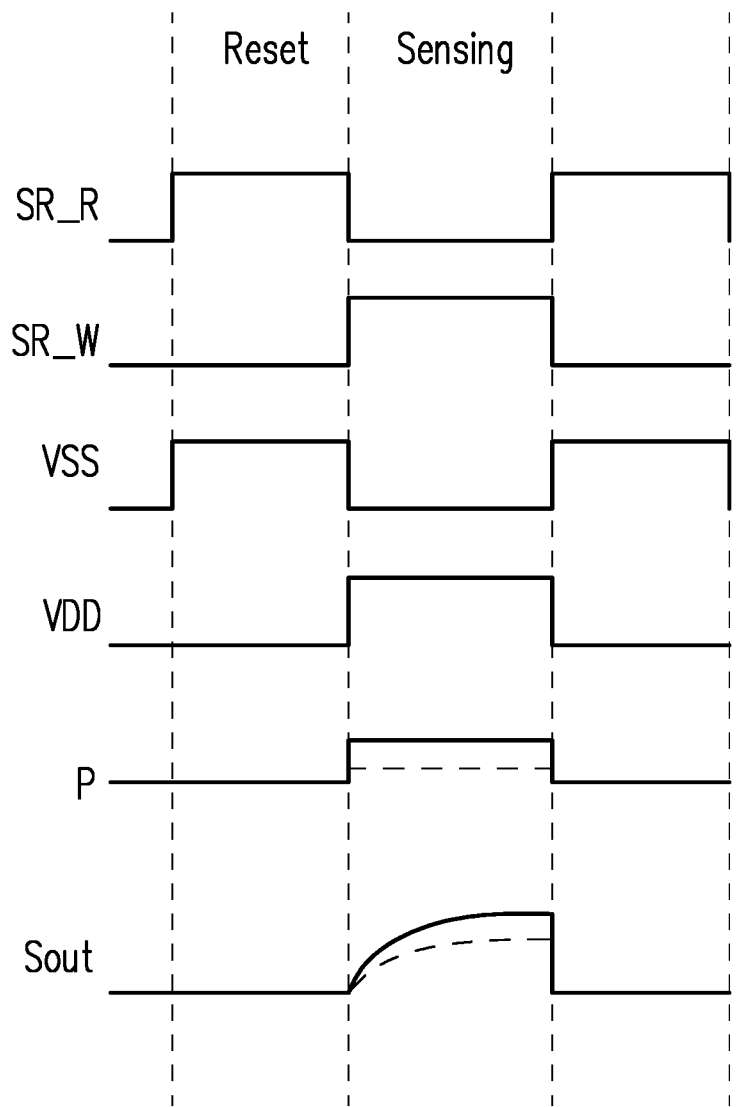
FIG. 2 is a schematic diagram of driving waveforms of a capacitive fingerprint sensor according to an embodiment of the invention.

FIG. 2 is a schematic diagram of driving waveforms of a capacitive fingerprint sensor according to an embodiment of the invention. Referring to FIG. 1 and FIG. 2, in the embodiment, these capacitive sensing pixels Pcapsen may be driven individually, row-by-row, or group-by-group, which depends on a wiring layout. Regarding a single capacitive sensing pixel Pcapsen, a driving timing at least includes a reset period Reset and a sensing period Sensing.

During the reset period Reset, the reset control signal SR_R and the first system voltage VSS are at a high voltage level, and the sensing control signal SR_W and the second system voltage VDD are at a low voltage level. At this time, the first transistor T1 is turned on, and the second transistor T2 is turned off, and the sensing voltage Vp is charged (or raised) to a high voltage level. Thus, a voltage across the sensing capacitor $C_{sensor}$ is a voltage difference between the high voltage level and the low voltage level, so as to set (or reset) the voltage across the sensing capacitor $C_{sensor}$.

During the sensing period Sensing after the reset period Reset, the reset control signal SR_R and the first system voltage VSS are at the low voltage level, and the sensing control signal SR_W and the second system voltage VDD are at the voltage high level. At this time, the first transistor T1 is turned off, and the second transistor T2 is turned on. Moreover, when a finger is placed on the capacitive sensing pixel Pcapsen, since distances between a ridge and a valley of the fingerprint from a surface of the capacitive sensing pixel Pcapsen are different, different parasitic capacitors CT will be induced.

Referring to FIG. 1, when the capacitive sensing pixel Pcapsen senses a ridge in the fingerprint, the parasitic capacitor CT of the sensing node P and the fingerprint is a capacitor $C_{cover}$ from the sensing node P to the surface of the capacitive sensing pixel Pcapsen; deduced by analogy, when the capacitive sensing pixel Pcapsen senses a valley in the fingerprint, the parasitic capacitor CT between the sensing node P and the fingerprint is the capacitor $C_{cover}$ connected in series to a capacitor $C_{Finger}$ from the surface of the capacitive sensing pixel Pcapsen to a skin surface of the valley.

According to the above, regarding the ridge and the valley, the capacitive sensing pixel Pcapsen may induce different parasitic capacitors CT, and the parasitic capacitor CT may divide a voltage with the sensing capacitor $C_{sensor}$, so that the capacitive sensing pixel Pcapsen may generate the sensing voltage Vp of different magnitudes. Further, the sensing voltage Vp=(a voltage difference between the high voltage level and the low voltage level×a capacitance of the sensing capacitor $C_{sensor}$)/(the capacitance of the sensing capacitor $C_{sensor}$+a stray capacitance+a capacitance of the parasitic capacitor CT).

For example, when the capacitive sensing pixel Pcapsen senses a ridge in the fingerprint, a lower sensing voltage Vp is generated due to a larger capacitance of the parasitic capacitor CT; when the capacitive sensing pixel Pcapsen senses a valley in the fingerprint, a higher sensing voltage Vp is generated due to the smaller capacitance of the parasitic capacitor CT. Since a turn-on program of the second transistor T2 depends on a voltage level of the sensing voltage Vp, when the capacitive sensing pixel Pcapsen senses the ridge in the fingerprint, the voltage level of the sensing output signal Sout may be lower, and when the capacitive sensing pixel Pcapsen senses the valley in the fingerprint, the voltage level of the sensing output signal Sout may be higher. Therefore, the voltage level of the sensing output signal Sout may be changed in response to the ridge or valley sensed by the capacitive sensing pixel Pcapsen.

In addition, the sensing readout circuit 120 may convert the voltage level of the sensing output signal Sout into a digital value and then collect the same to provide output data Dout related to the fingerprint, or may compare the voltage level of the sensing output signal Sout with a threshold to generate a logic value and then collect the same to provide the output data Dout related to the fingerprint. The foregoing may be determined according to a circuit design, and the embodiment of the invention is not limited thereto.

Figure 3:
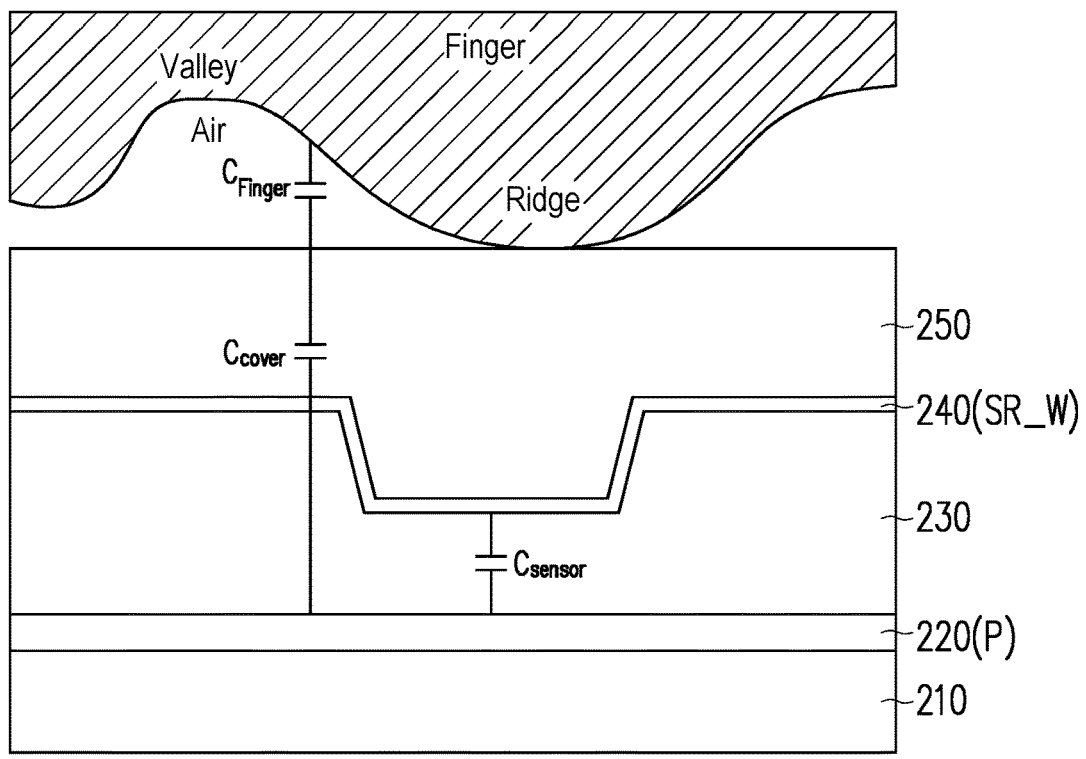
FIG. 3 is a schematic cross-sectional view of a sensing capacitor according to an embodiment of the invention.

FIG. 3 is a schematic cross-sectional view of a sensing capacitor according to an embodiment of the invention. Referring to FIG. 1 and FIG. 3, in the embodiment, the capacitive sensing pixel Pcapsen may be disposed on a substrate 210, and a metal layer 220, an insulating layer 230, an indium tin oxide (ITO) transparent conductive layer 240 and an insulating layer 250 are disposed on the substrate 210 in sequence. In the embodiment, the sensing capacitor $C_{sensor}$ is formed by the metal layer 220 and the ITO transparent conductive layer 240, where the metal layer 220 further serves as the sensing node P, i.e., the capacitor $C_{cover}$ is formed between the metal layer 220 and the surface of the capacitive sensing pixel Pcapsen. Moreover, the ITO transparent conductive layer 240 is configured to transmit (or receive) the sensing control signal SR_W.

Figure 4:
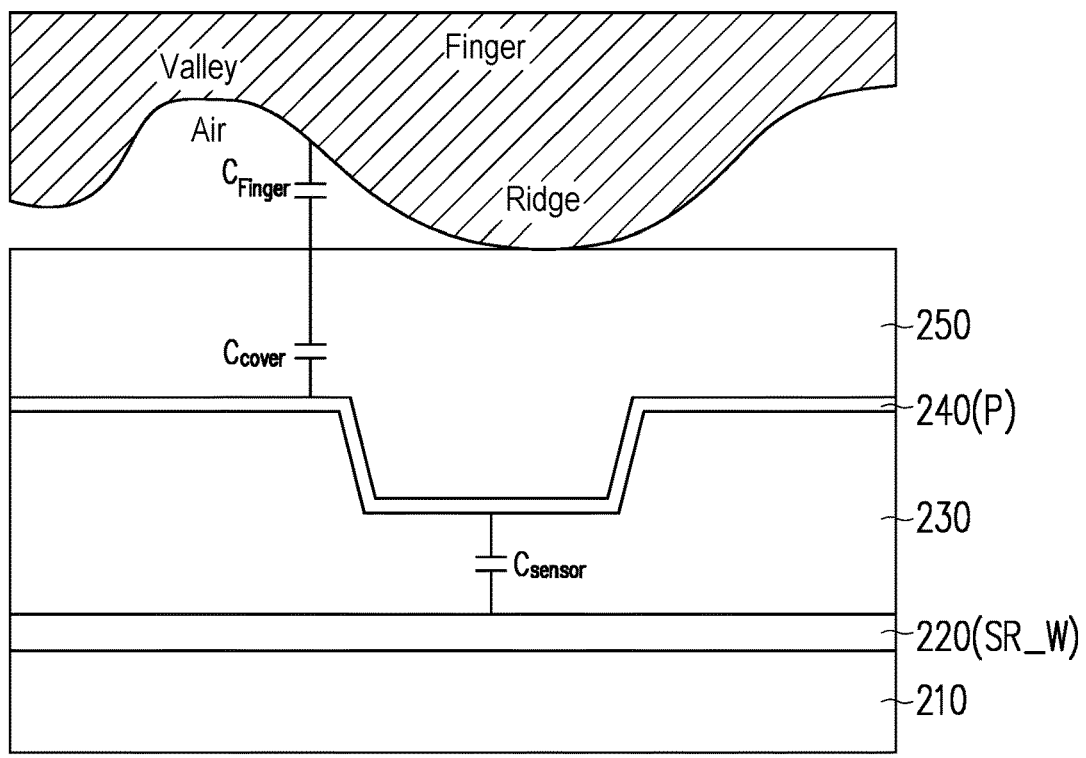
FIG. 4 is a schematic cross-sectional view of a sensing capacitor according to another embodiment of the invention.

FIG. 4 is a schematic cross-sectional view of a sensing capacitor according to another embodiment of the invention. Referring to FIG. 1, FIG. 3 and FIG. 4, where the same or similar components are denoted by the same or similar symbols. In the embodiment, the ITO transparent conductive layer 240 is further used as the sensing node P, i.e., the capacitor $C_{cover}$ is formed between the metal layer 220 and the surface of the capacitive sensing pixel Pcapsen, and the metal layer 220 is configured to transmit (or receive) the sensing control signal SR_W.

In summary, in the fingerprint sensor of the embodiment of the invention, each capacitive sensing pixel may be composed of a first transistor, a second transistor, a sensing capacitor and a current source, i.e., the capacitive sensing pixels with a low circuit area are used to form a high resolution capacitive fingerprint sensing panel. Moreover, since the capacitive fingerprint sensing panel does not require a backlight module, the cost of hardware is reduced and a thickness of the mechanism is reduced.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A capacitive fingerprint sensor, comprising:
a plurality of capacitive sensing pixels, each of the capacitive sensing pixels comprising:
a sensing node;
a first transistor, having a first terminal receiving a first system voltage, a control terminal receiving a reset control signal, and a second terminal coupled to the sensing node;
a sensing capacitor, coupled between the sensing node and a sensing control signal; and a second transistor, having a first terminal receiving a second system voltage, a control terminal receiving a sensing voltage of the sensing node, and a second terminal providing a sensing output signal,
wherein each of the capacitive sensing pixels further comprises a current source coupled to the second terminal of the second transistor;
wherein the first transistor and the second transistor are respectively an N-type transistor;
wherein during a reset period, the reset control signal and the first system voltage are at a high voltage level, and the sensing control signal and the second system voltage are at a low voltage level.

2. The capacitive fingerprint sensor according to claim 1, wherein during a sensing period after the reset period, the reset control signal and the first system voltage are at the low voltage level, and the sensing control signal and the second system voltage are at the high voltage level.

3. The capacitive fingerprint sensor according to claim 1, wherein the sensing capacitor is formed by a metal layer and an indium tin oxide transparent conductive layer, wherein the metal layer further serves as the sensing node.

4. The capacitive fingerprint sensor according to claim 1, wherein the sensing capacitor is formed by a metal layer and an indium tin oxide transparent conductive layer, wherein the indium tin oxide transparent conductive layer further serves as the sensing node.

5. The capacitive fingerprint sensor according to claim 1, further comprising a sensing readout circuit coupled to the capacitive sensing pixels to provide an output data related to a fingerprint based on the sensing output signal of the capacitive sensing pixels.

\* \* \* \* \*